J. W. JONES.
SPEEDOMETER.
APPLICATION FILED JAN. 30, 1917.
1,408,598.
Patented Mar. 7, 1922.
3 SHEETS—SHEET 1.
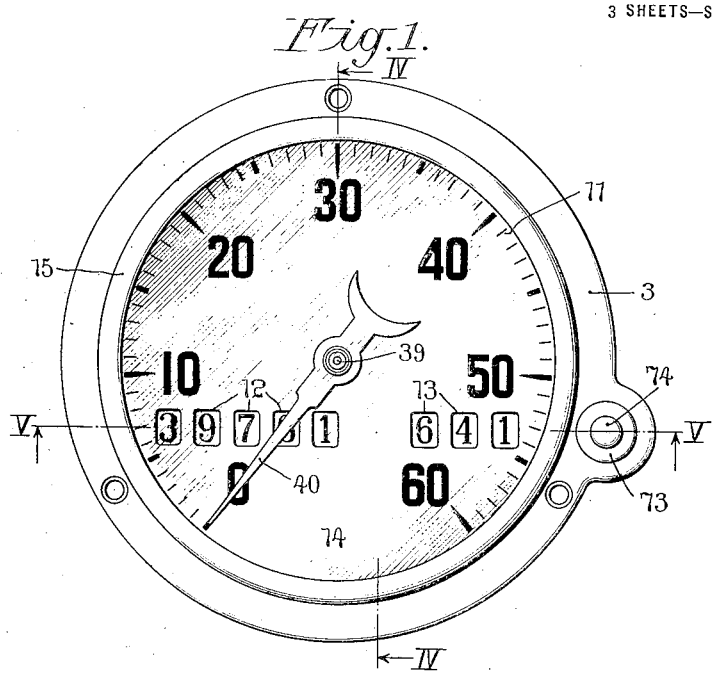
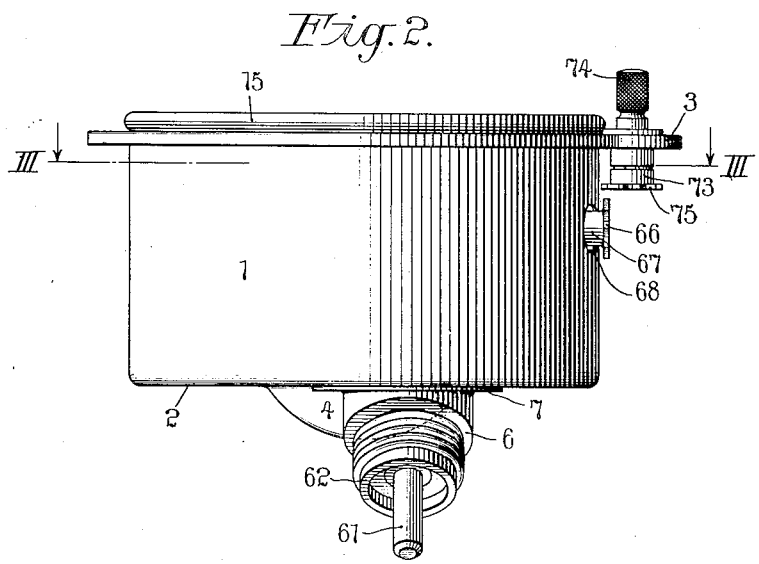
Inventor:
Joseph W. Jones
by attorneys J. W. JONES.
SPEEDOMETER.
APPLICATION FILED JAN. 30, 1917.
1,408,598.
Patented Mar. 7, 1922.
3 SHEETS—SHEET 2.
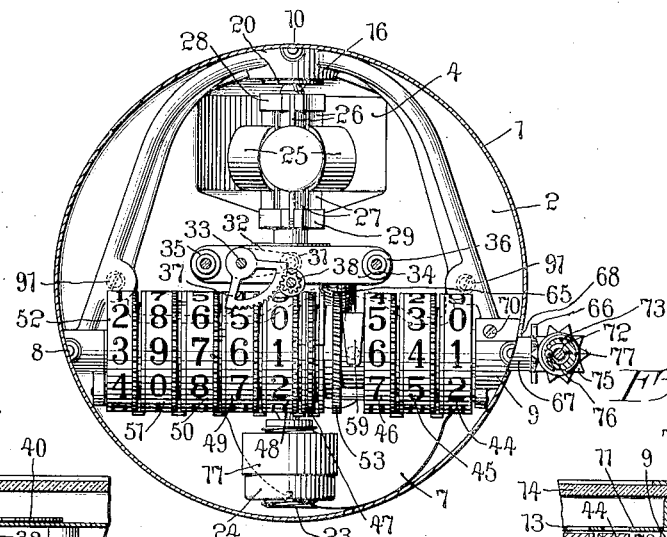
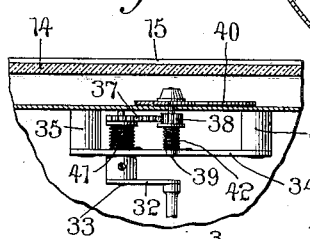
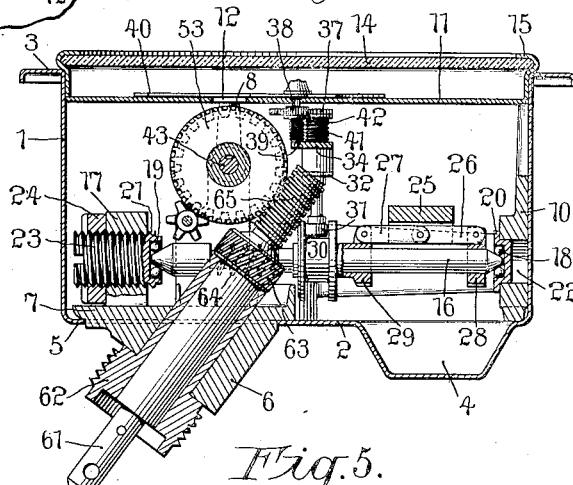
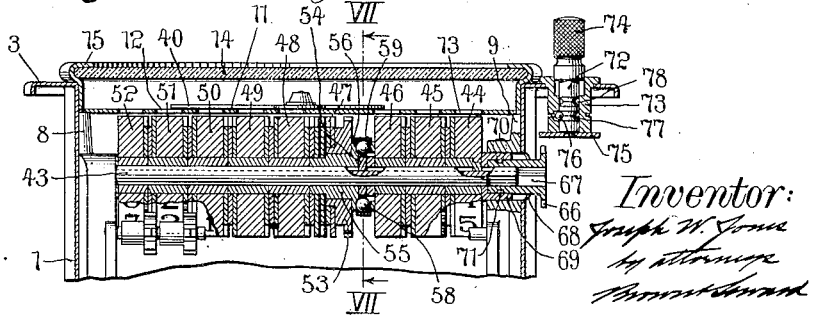
Inventor:
Joseph W. Jones
by attorney

J. W. JONES.
SPEEDOMETER.
APPLICATION FILED JAN. 30, 1917.

1,408,598.

Patented Mar. 7, 1922.
3 SHEETS—SHEET 3.

Inventor
Joseph W. Jones
by attorneys

UNITED STATES PATENT OFFICE.

JOSEPH W. JONES, OF NEW YORK, N. Y.

SPEEDOMETER.

1,408,598.  Specification of Letters Patent.  Patented Mar. 7, 1922.

Application filed January 30, 1917. Serial No. 145,420.

*To all whom it may concern:*

Be it known that I, JOSEPH W. JONES, a citizen of the United States, and resident of the borough of Manhattan, in the city and State of New York, have invented a new and useful Improvement in Speedometers, of which the following is a specification.

My invention relates to certain improvements in the construction, form and arrangement of the several parts of a registering speedometer, whereby the device will be materially simplified, its efficiency increased and its cost to manufacture reduced.

My invention comprises speed indicator and odometer mechanisms having their driving shafts arranged transversely of the casing at right angles to each other; and a main drive shaft arranged obliquely to the first-named shafts and having a "geared-up" direct connection with the speed indicator governor shaft and a "geared-down" direct connection with the odometer shaft.

My invention also comprises an improved odometer resetting mechanism including a manually operated member movable into and out of its operative connection with the balance of the mechanism.

My invention more particularly comprises certain improvements in the speed indicator and odometer mechanisms and also in the assembly of parts, as will hereinafter appear, whereby the speed indicator and odometer mechanisms may be removed as a whole from the casing to permit ready access to the mechanisms without disturbing their operative connections with the main drive shaft.

Figure 9:
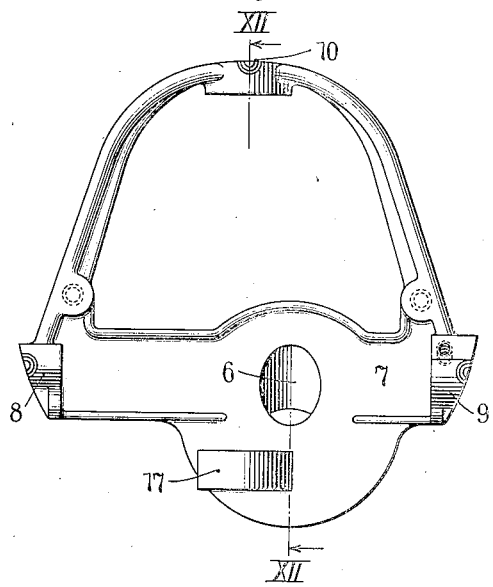
Figure 10:
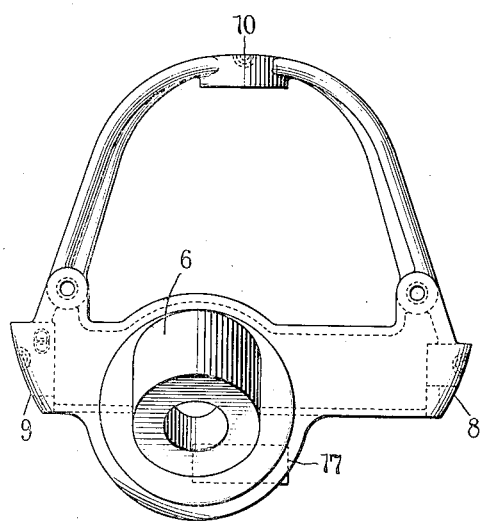
Figure 11:
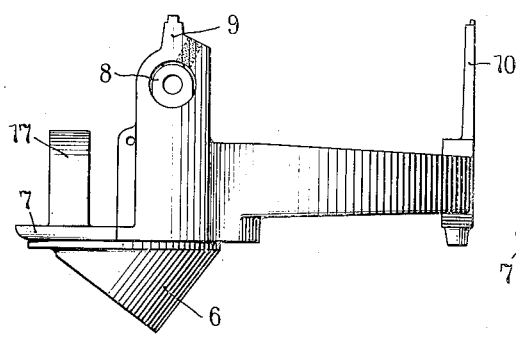
Figure 12:
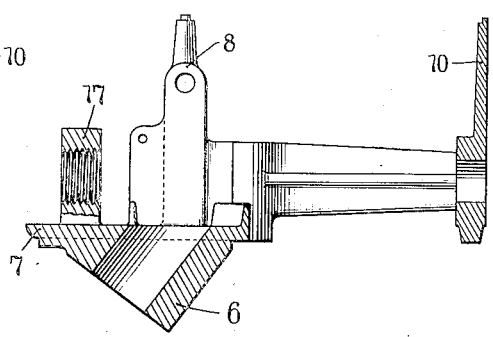

A practical embodiment of my invention is represented in the accompanying drawings, in which Fig. 1 represents the device in front elevation, Fig. 2 represents the device in side elevation, Fig. 3 is a section taken in the plane of the line III—III of Fig. 2, Fig. 4 is a section taken in the plane of the line IV—IV of Fig. 1, Fig. 5 is a detail section taken in the plane of the line V—V of Fig. 1, Fig. 6 is a detail section showing the odometer resetting device in its operative position, Fig. 7 is a detail section taken in the plane of the line VII—VII of Fig. 5, Fig. 8 is a detail section at the indicator mechanism taken at right angles to Fig. 4, Fig. 9 is a top plan view of the frame which carries the several mechanisms, Fig. 10 is a bottom plan view of the same, Fig. 11 is a side view of the frame, and Fig. 12 is a section taken in the planes of the line XII—XII of Fig. 9.

The casing, in the present instance, comprises the cylindrical side walls 1, the bottom 2, and the annular lateral flange 3. A depression 4 is provided in the bottom 2 of the casing to permit the free action of the indicator governor weights under high speeds. The bottom 2 of the casing has a hole 5, through which a hollow lug 6, depending from the base 7 of the mechanism supporting frame, projects when the parts are assembled. This supporting frame is of skeleton form and has uprising arms 8, 9, 10, which snugly fit within the side walls 1 of the casing. A dial 11 fits within the side walls of the casing and is supported upon the free ends of the arms 8, 9, 10, of the frame, against turning, which dial is provided with the usual windows 12 and 13 for disclosing the numerals on the faces of the wheels of the "total" register and "trip" register of the odometer. The face of this dial is also provided with the usual graduated speed scale of the indicator mechanism.

A transparent front 14 for the casing is provided with a frame 15 which fits snugly within the side walls of the casing at the mouth thereof and it is retained in position by its frictional contact with said side walls.

A transversely arranged speed indicator governor shaft 16 is anti-frictionally mounted between the uprising arm 10 and a lug 17 also uprising from the base 7 of the frame. In the present instance, the opposite ends of the shaft 16 are made conical and run in annular ball bearings 18, 19, carried by cupped ball races 20, 21, the ball race 20 being inserted into a hole 22 in the arm 10 and the ball race 21 forming a part of an adjusting screw 23 passing through the lug 17. A lock nut 24 is provided for holding the screw 23 in its proper adjustment.

A centrifugal governor is mounted on the shaft 16, the governor weights 25 being connected by the usual arms 26, 27, respectively, to the relatively fixed collar 28 and the sliding collar 29 on the shaft 16. The sliding collar 29 is provided with a circumferential groove 30 within which the stud or roller 31 of the arm 32 is positioned. This arm 32 is fixed to a rock shaft 33 mounted in a plate 34 carried by the dial 11 and spaced therefrom by blocks 35, 36. Between the plate 34 and the back of the dial 11, the rock shaft 33 is provided with a segment gear 37 which meshes with a pinion 38 fixed to a rock shaft 39 mounted in the plate 34 and projecting through the dial 11. This rock shaft 39 has a pointer 40 fixed thereto at the front of the dial, which pointer is arranged to swing back and forth over the speed indicator scale on the face of the dial as its shaft is rocked. Springs 41, 42, embracing the rock shafts 33 and 39 are attached to the plate 34 and the shafts, which springs tend to return the pointer 40 to its zero position, and to hold the stud or roller 31 pressed against the rear wall of the groove 30 in the sliding sleeve 29, to keep the pointer steady in its different positions, in action.

The odometer shaft 43 is arranged transversely of the device at right angles to the indicator governor, shaft 16 and it is mounted to rotate in the uprising arms 8 and 9 of the supporting frame. The ends of this shaft 43 do not project beyond the outer faces of the arms 8 and 9.

The "trip" register of the odometer is shown as comprising the usual three numeral bearing wheels 44, 45, 46, the wheel 44 being fixed to rotate with the shaft 43 and the wheels 45, 46, being loosely mounted on the shaft. The wheel 45 is turned at intervals by the wheel 44 and the wheel 46 is turned at intervals by the wheel 45, through the usual connections which will not be specifically described herein.

The "total" register is shown as comprising the usual intermediate wheel 47 and the usual five numeral bearing wheels 48, 49, 50, 51, 52. The wheels 48, 49, 50, 51, 52, are loosely mounted on the shaft 43, the wheel 48 being turned at intervals by the wheel 47, the wheel 49 at intervals by the wheel 48, the wheel 50 at intervals by the wheel 49, the wheel 51 at intervals by the wheel 50 and the wheel 52 at intervals by the wheel 51, through the usual connections which will not be specifically described herein. The odometer gear wheel 53 is provided with a slip clutch connection with the shaft 43 as, for instance, as follows: A sleeve 55 is loosely mounted on the shaft 43, to which the gear wheel 53 is fixed; which sleeve is provided with an annular flange 56 surrounding a star wheel 54 fixed to the shaft 43 and it is provided with holes 57 for the reception of balls 58. A band spring 59 partly surrounds the flange 56 and serves to yieldingly hold the balls 58 in engagement with the star wheel 54. A pin 60 serves to hold the spring 59 in position.

The main drive shaft 61 is arranged obliquely to the speed indicator governor and odometer shafts and is mounted in a bushing 62 inserted through the supporting frame lug 6. This drive shaft 61 has a "geared-up" direct driving connection with the speed indicator governor shaft 16 through a gear 63 on the shaft 61 which meshes with a worm 64 on the shaft 16. This main drive shaft 61 also has a "geared-down" direct driving connection with the odometer shaft 43 through a worm 65 on the shaft 61 which meshes with the gear 53 on the shaft 43.

The odometer resetting mechanism includes a manually operated member carried by the casing, movable into and out of its operative connection with the balance of the mechanism.

This resetting mechanism comprises a star wheel 66 carried by a sleeve 67, which sleeve is inserted through an opening 68 in the side wall 1 of the casing over the squared end of the shaft 43 so that this star wheel 66 turns with the said shaft. This sleeve 67 is mounted to rotate in a bushing 69 but is held against unintentional removal by means of a screw 70 carried by the arm 9, the inner end of which screw passes through the bushing 69 and projects into a circumferential groove 71 in the sleeve 67.

The manually operated longitudinally movable rotary member comprises a shaft 72 rotatably mounted in a suitable bushing 73 carried by the lateral flange 3 of the casing. This shaft is provided at one end with a suitable handle 74 for manipulating it and at its other end with a star wheel 75. Means are provided for yieldingly holding this shaft 72 and its star wheel 75 in or out of its operative connection with the star wheel 66, which means, in the present instance, is shown as comprising a spring-pressed ball 76 carried by the bushing 73, arranged to travel in one or the other of two circumferential grooves 77, 78, in the shaft 72.

It will be understood that in resetting the odometer the resistance of the gear wheel 53 will be sufficient to permit the star wheel 54 fixed to the shaft to travel around within the annular flange 56 of the sleeve 55, thus permitting the rotation of the wheels of the "trip" register without disturbing the wheels of the "total" register.

When the parts are assembled, the supporting frame is secured to the bottom 2 of the casing by suitable screws 91.

The parts may be readily removed from within the casing without disturbing the driving connections between the main drive shaft 61 and the speed indicator and odometer mechanisms. This may be accomplished by removing the transparent front 14 with its frame 15; releasing and removing the star wheel 66 and its sleeve 67 by unscrewing the screw 70 and unscrewing the screws 91 which fasten the frame to the bottom of the casing. It will thus be seen that substantially the entire apparatus can be assembled on the supporting frame before the frame is inserted into the casing. This materially simplifies the work of assembling the parts.

A very simple construction is also obtained by providing a direct geared connection between the oblique main drive shaft and both the speed indicator and odometer shafts.

By providing a "geared-up" connection between the main drive shaft and the indicator governor shaft, the governor may be driven at high speeds while the main drive shaft 61 is rotating at low speeds, thus ensuring a more accurate operation of the indicator pointer, especially at the low rotative speeds of the main drive shaft.

From the above description, it will also be seen that the indicator pointer and its operating connection with the sliding sleeve on the governor shaft are carried by the dial and may be removed with the dial.

It is evident that various changes might be made in the construction, form and arrangement of the several parts without departing from the spirit and scope of my invention; hence I do not wish to limit myself to the particular structure shown and described, but

What I claim is:—

In a speedometer, a supporting frame having a rearwardly projecting lug for mounting the main drive shaft, two oppositely arranged forwardly projecting arms for mounting the odometer shaft and a third forwardly projecting arm and a lug for mounting the speed indicator governor shaft.

In testimony, that I claim the foregoing as my invention, I have signed my name this 22nd day of January 1917.

JOSEPH W. JONES.